US012676656B2

(12) United States Patent
Mu

(10) Patent No.: US 12,676,656 B2
(45) Date of Patent: Jul. 7, 2026

(54) COMMUNICATION METHOD, COMMUNICATION APPARATUS, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 372 days.

(21) Appl. No.: 18/289,642

(22) PCT Filed: May 8, 2021

(86) PCT No.: PCT/CN2021/092489
§ 371 (c)(1),
(2) Date: Nov. 6, 2023

(87) PCT Pub. No.: WO2022/236502
PCT Pub. Date: Nov. 17, 2022

(65) Prior Publication Data
US 2024/0275450 A1     Aug. 15, 2024

(51) Int. Cl.
*H04B 7/06* (2006.01)
*H04L 5/00* (2006.01)
*H04W 72/542* (2023.01)

(52) U.S. Cl.
CPC ......... *H04B 7/0626* (2013.01); *H04L 5/0048* (2013.01); *H04W 72/542* (2023.01)

(58) Field of Classification Search
CPC ..... H04B 7/0626; H04L 5/0048; H04L 5/001; H04L 5/0693; H04W 72/542; H04W 72/04; H04W 24/10

USPC .................................................. 370/329–330
See application file for complete search history.

(56) References Cited

U.S. PATENT DOCUMENTS

| | | | |
|---|---|---|---|
| 2017/0041905 A1* | 2/2017 | Chen ...................... | H04W 72/23 |
| 2018/0076924 A1* | 3/2018 | Lee ........................ | H04L 5/0094 |
| 2019/0132109 A1* | 5/2019 | Zhou ..................... | H04L 27/2607 |
| 2020/0119893 A1 | 4/2020 | Zhang et al. | |
| 2020/0404690 A1 | 12/2020 | Lee et al. | |
| 2022/0209920 A1* | 6/2022 | Wu ......................... | H04W 72/21 |

(Continued)

FOREIGN PATENT DOCUMENTS

CN          110800238 A       2/2020

OTHER PUBLICATIONS

European Patent Application No. 21941083.4 Search Report dated Feb. 6, 2025, 9 pages.

(Continued)

*Primary Examiner* — Candal Elpenord
(74) *Attorney, Agent, or Firm* — Cozen O'Connor

(57) ABSTRACT

The present disclosure provides a communication method, a communication apparatus, and a storage medium. The communication method includes: processing information transmitted on at least one sub-band where sub-band monitoring conflict occurs in response to determining that the sub-band monitoring conflict occurs in a terminal; in which the sub-band monitoring conflict occurring in the terminal includes that the terminal needs to monitor a channel state information (CSI) measurement reference signal on a first sub-band, and needs to perform control channel monitoring and/or data reception on a second sub-band.

8 Claims, 5 Drawing Sheets

S11 determining that the sub-band monitoring conflict occurs in a terminal; in which the sub-band monitoring conflict occurring in the terminal comprises that the terminal needs to monitor a channel state information (CSI) measurement reference signal on a first sub-band, and needs to perform control channel monitoring and/or data reception on a second sub-band

S12 processing information transmitted on at least one sub-band where sub-band monitoring conflict occurs

(56) References Cited

U.S. PATENT DOCUMENTS

2023/0180266 A1\* 6/2023 Hwang ................. H04W 72/25
370/329
2023/0189392 A1\* 6/2023 Babaei .................. H04L 5/0055
370/329
2024/0089999 A1\* 3/2024 Ko ........................ H04W 72/02

OTHER PUBLICATIONS

PCT/CN2021/092489 International Search Report dated Dec. 17, 2021, 2 pages.

\* cited by examiner

S21

S22

S31

S32

S41

S42

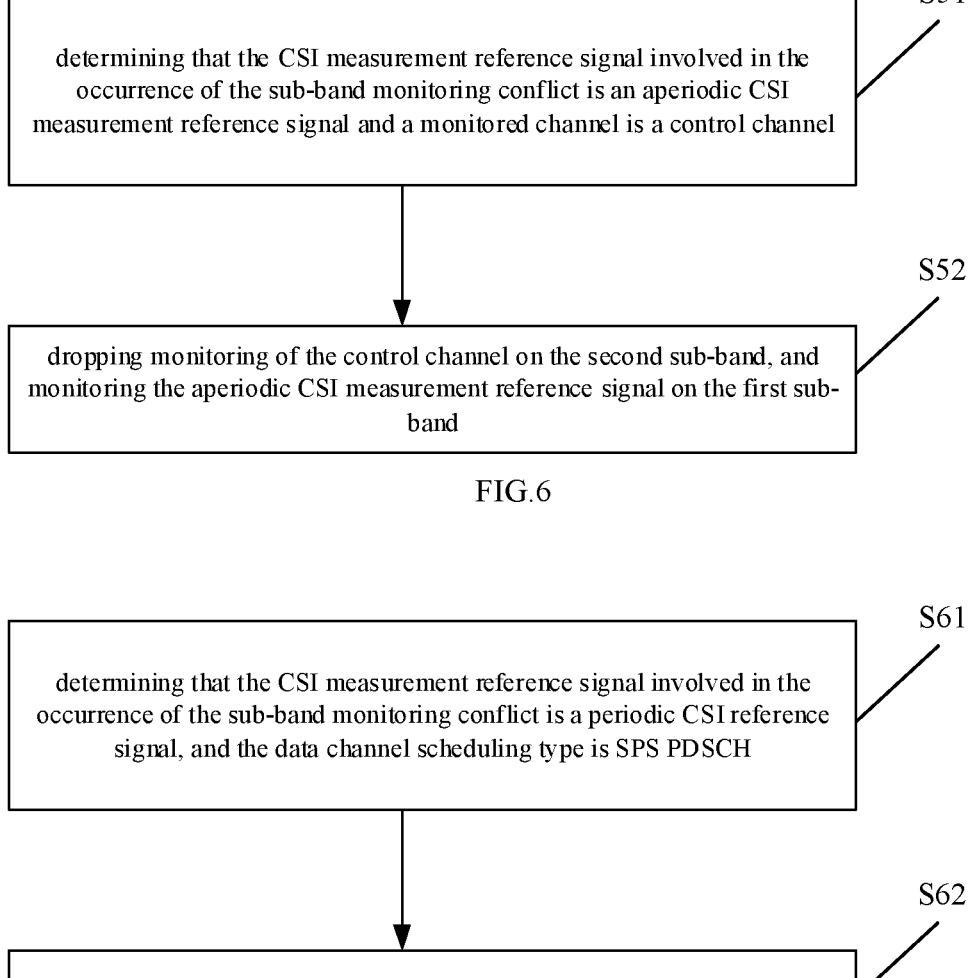

S51 determining that the CSI measurement reference signal involved in the occurrence of the sub-band monitoring conflict is an aperiodic CSI measurement reference signal and a monitored channel is a control channel

S52 dropping monitoring of the control channel on the second sub-band, and monitoring the aperiodic CSI measurement reference signal on the first sub-band

FIG.6

S61 determining that the CSI measurement reference signal involved in the occurrence of the sub-band monitoring conflict is a periodic CSI reference signal, and the data channel scheduling type is SPS PDSCH

S62 dropping monitoring of the periodic CSI reference signal on the first sub-band, and performing data reception on the second sub-band

FIG.7

S71 determining that monitoring of the CSI measurement reference
signal on the first sub-band is not completed

S72 monitoring the control resource set on the first sub-band and/or
performing data reception on the first sub-band

100 processing unit

101

COMMUNICATION METHOD, COMMUNICATION APPARATUS, AND STORAGE MEDIUM

CROSS-REFERENCE TO RELATED APPLICATIONS

The present application is a national phase entry under 35 USC § 371 of International Application PCT/CN2021/092489, filed May 8, 2021, the entire disclosures of which are incorporated herein by reference.

TECHNICAL FIELD

The present disclosure relates to a communication technical field, and more particularly to a communication method, a communication apparatus and a storage medium.

BACKGROUND

In a long term evolution (LTE) 4G wireless communication system, in order to support Internet of Things (IoT) services, two major technologies are proposed, i.e., machine type communication (MTC) and narrowband Internet of Things (NB-IoT). These two technologies are mainly targeted at low-speed, high-latency communication and other scenarios such as meter reading and environmental monitoring, for example. NB-IoT currently supports a maximum rate of only several hundred kilobytes, and MTC currently supports a maximum rate of only a few Mbits. With the continuous development of Internet of Things services, services such as video surveillance, smart home, wearable devices and industrial sensing monitoring are becoming more popular. These services usually require rates of tens to 100 M, and also have relatively high requirements on latency. The MTC in the related art also makes it difficult for NB-IoT technology to meet the requirements. Therefore, there is a requirement to design a new terminal type in 5G New Radio (NR) to cover mid-range IoT devices. In the current 3GPP standardization, this new terminal type is called a low-capability terminal, sometimes also called a reduced capability UE, or a Redcap terminal, or simply NR-lite.

SUMMARY

In order to overcome problems in a related art, the present disclosure provides a communication method, a communication apparatus and a storage medium.

According to a first aspect of the present disclosure, a communication method is provided. The communication method includes:

processing information transmitted on at least one subband where sub-band monitoring conflict occurs in response to determining that the sub-band monitoring conflict occurs in a terminal; in which the sub-band monitoring conflict occurring in the terminal includes that the terminal needs to monitor a channel state information (CSI) measurement reference signal on a first sub-band, and needs to perform control channel monitoring and/or data reception on a second sub-band.

According to a second aspect of the present disclosure, a communication device is provided. The communication device includes:

a processor;

a memory for storing instructions executable by the processor.

The processor is configured to perform the communication method according to the first aspect or any one of the first aspect.

According to a third aspect of the present disclosure, a storage medium is provided. The storage medium has stored therein instructions that, when executed by a processor of a terminal, cause the terminal to execute the communication method according to the first aspect or any one of the first aspect.

It is understood that the foregoing general description and the following detailed description are illustrative and explanatory only, and do not limit the present disclosure

BRIEF DESCRIPTION OF THE DRAWINGS

The accompanying drawings, which are incorporated in and constitute a part of this specification, illustrate embodiments consistent with the present disclosure and together with the specification serve to explain principles of embodiments of the present disclosure.

FIG. 6 is a flowchart illustrating a communication method according to an illustrative embodiment.

FIG. 7 is a flowchart illustrating a communication method according to an illustrative embodiment.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to embodiments of the disclosure as recited in the appended claims.

Since the bandwidth of the redcap terminal is limited, there are currently two ways to enable the redcap terminal to better obtain frequency diversity or frequency selective gain:

Manner 1: configuring the terminal with a bandwidth part (BWP) that is greater than the terminal bandwidth.

Manner 2: configuring a plurality of frequency band parts for the terminal. Each frequency band part is within the bandwidth capability of the terminal, but the terminal may perform frequency hopping of data within these frequency bands or select a better frequency band part for data reception.

However, when configuring sub-bands or frequency bands for the redcap terminals based on the above manner, it will appear that the terminal needs to monitor the channel state information (CSI) reference signal (CSI-RS) on a BWP, but there is a need to monitor physical downlink control channel (PDCCH) and/or receive data on another BWP, and sub-band monitoring conflicts may occur. There is currently no good solution to this conflict in seed band monitoring.

Figure 1:
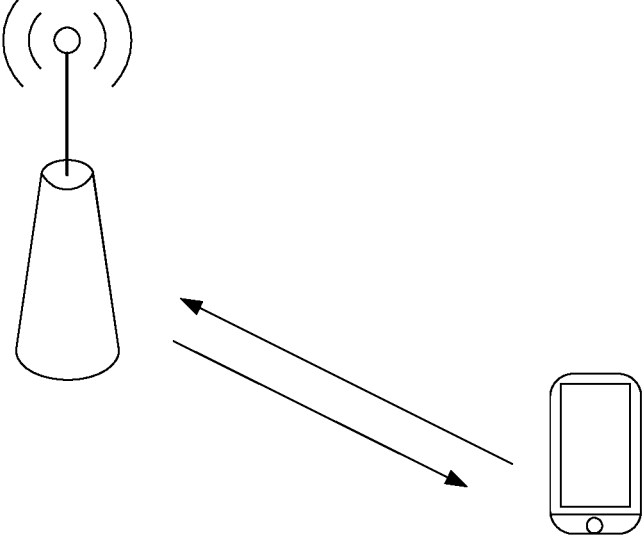
FIG. 1 is a schematic diagram illustrating a wireless communication system according to an illustrative embodiment.

A communication method provided by embodiments of the present disclosure may be applied to a wireless communication system shown in FIG. 1. Referring to FIG. 1, the wireless communication system includes a terminal and a network device. Information is sent and received between the terminal and the network device via wireless resources.

It is understood that the wireless communication system shown in FIG. 1 is only for schematic illustration, and the wireless communication system may also include other network devices, such as core network devices, wireless relay devices, and wireless backhaul devices, and the like, which are not shown in FIG. 1. The number of the network devices and the terminals included in the wireless communication system is not limited in embodiments of the present disclosure.

It is further understood that the wireless communication system in embodiments of the present disclosure is a network that provides wireless communication functions. The wireless communication system may use different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency-division multiple access (single carrier FDMA, SC-FDMA), carrier sense multiple access with collision avoidance. According to capacity, speed, delay and other factors of the different networks, the network may be divided into a $2^{nd}$ generation (2G) network, a 3G network, a 4G network or a future evolution network, such as a 5G network. The 5G network may also be called a new radio (NR). For convenience of description, sometimes, the wireless communication network is simply referred to as a network in the present disclosure.

Furthermore, the network device involved in the present disclosure may also be called a wireless access network device. The wireless access network device may be: a base station, an evolved base station (evolved node B, base station), a home base station, an access point (AP) in a wireless fidelity (WIFI) system, a wireless relay node, a wireless backhaul node, a transmission point (TP) or a transmission and reception point (TRP), etc., or may also be a gNB in an NR system, or may also be a component or a part of device that constitutes the base station. When it is a vehicle-to-everything (V2X) communication system, the network device may also be a vehicle-mounted device. It is understood that in embodiments of the present disclosure, the specific technology and the specific device form adopted by the network device are not limited.

Further, the terminals involved in the present disclosure may also be referred to as a terminal device, a user equipment (UE), a mobile station (MS), a mobile terminal (MT), etc., which is a device providing voice and/or data connectivity to a user. For example, the terminal may be a device with a wireless connection function, e.g., a handheld device, a vehicle-mounted device, and the like. Currently, examples of some terminals are: a mobile phone, a customer premise equipment (CPE), a pocket personal computer (PPC), a handheld computer, a personal digital assistant (PDA), a laptop, a tablet, a wearable device, or a vehicle-mounted device, etc. In addition, when it is a vehicle-to-everything (V2X) communication system, the terminal device may also be a vehicle-mounted device. It is understood that the specific technology and specific device form used by the terminal are not limited in embodiments of the present disclosure.

The terminal involved in embodiments of the present disclosure may be understood as a new type of terminal designed in 5G NR: reduced capability UE or NR-lite for short. In embodiments of the present disclosure, the new terminal is called a redcap terminal or 5G NR-lite.

Similar to Internet of Things (IoT) devices in long term evolution (LTE), 5G NR-lite generally needs to meet the following requirements:

low cost, low complexity;

a certain of coverage enhancement;

power saving.

In a related art, the terminal monitors a BWP, and the frequency range of the monitored BWP is also within the bandwidth of the terminal. The terminal may receive data, monitor control channels, and measure CSI-RS within this BWP. Moreover, in order to enable the bandwidth-limited Redcap terminal to better obtain frequency diversity or frequency selectivity gain, the terminal is configured with a BWP that is larger than the terminal bandwidth, or the terminal is configured with a plurality of frequency band parts. Each frequency band part is within the bandwidth capability range of the terminal, but the terminal may perform frequency hopping of data within these frequency bands or select a better part of the frequency band for data reception, as shown in FIG. 6.

However, when configuring sub-bands or frequency bands for Redcap terminals based on the above manners, it may happen that the terminal needs to monitor the CSI measurement reference signal on one BWP, but also needs to monitor the control channel and/or receive data on another BWP, and sub-band monitoring conflict occurs.

Embodiments of the present disclosure provide a communication method. When it is determined that a sub-band monitoring conflict occurs in a terminal, the information transmitted on at least one sub-band where a sub-band monitoring conflict occurs is processed to process the sub-band monitoring conflict and eliminate the existing sub-band monitoring conflict, thereby improving the communication performance of the information transmitted on the sub-band.

The sub-band monitoring conflict occurring in the terminal may be understood as the terminal needs to perform CSI measurement reference signal monitoring on one sub-band and needs to perform control channel monitoring and/or data reception on another sub-band.

It may be understood that the data involved in embodiments of the present disclosure may include control signaling and/or user data.

In embodiments of the present disclosure, for convenience of description, the sub-band for CSI measurement reference signal monitoring is called as a first sub-band, and the sub-band for control channel monitoring and/or data reception is called a second sub-band.

Figure 2:
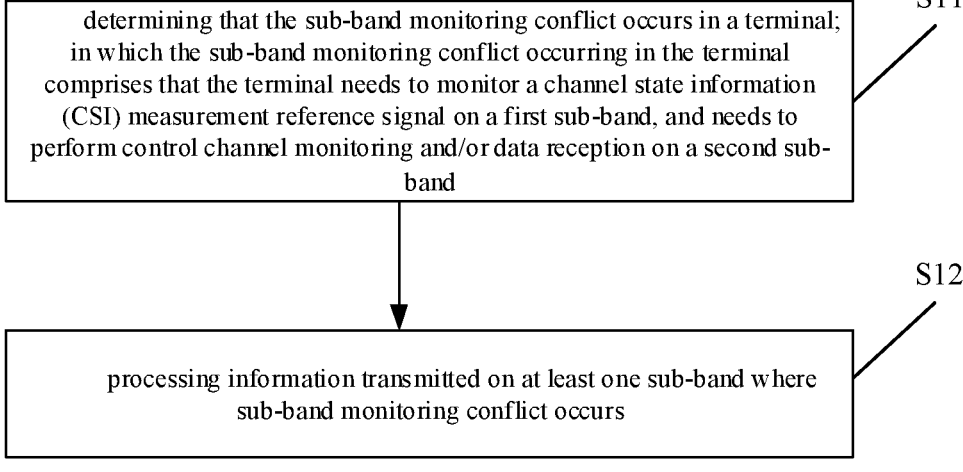
FIG. 2 is a flowchart illustrating a communication method according to an illustrative embodiment.

FIG. 2 is a flowchart illustrating a communication method according to an illustrative embodiment. As shown in FIG. 2, the communication method includes the following steps.

In step S11, it is determined that a sub-band monitoring conflict occurs in a terminal, the sub-band monitoring conflict occurring in the terminal includes that the terminal needs to monitor a channel state information (CSI) measurement reference signal on a first sub-band, and needs to perform control channel monitoring and/or data reception on a second sub-band.

In step S12, information transmitted on at least one sub-band where sub-band monitoring conflict occurs is processed.

In the communication method provided by embodiments of the present disclosure, when a sub-band monitoring conflict occurs in the terminal, the information transmitted on at least one sub-band where the sub-band monitoring conflict occurs may be processed to eliminate the sub-band monitoring conflict that has occurred, thereby improving the communication performance of information transmission on sub-bands, which ensures the monitoring of CSI measurement reference signals, and the effective communication process of control channel monitoring and/or data reception.

In the communication method provided by embodiments of the present disclosure, channel monitoring is controlled on the second sub-band, which may be PDCCH monitoring. Receiving data on the second sub-band may be understood as performing data scheduling on a physical downlink shared channel (PDSCH).

In the communication method provided by embodiments of the present disclosure, sub-band monitoring conflicts are processed based on predefined rules. For example, information transmitted on at least one sub-band where a sub-band monitoring conflict occurs is processed based on predefined rules.

In one embodiment of embodiments of the present disclosure, based on the control channel and/or data channel scheduling type involved in the sub-band monitoring conflict and the CSI measurement reference signal, information transmitted on at least one sub-band where the sub-band monitoring conflict occurs may be is processed.

In one embodiment, in the communication method provided by embodiments of the present disclosure, base on the CSI measurement reference signal on the first sub-band where the sub-band monitoring conflict occurs and the control channel and/or data channel scheduling type on the second sub-band, a priority of monitoring the CSI measurement reference signal on the first sub-band and monitoring the control channel and/or data scheduling on the second sub-band, may be determined. Based on the priority, the sub-band monitoring conflicts are processed to ensure that the monitoring of the CSI measurement reference signal and the communication process of control channel monitoring and/or data reception are carried out effectively.

In an example, in embodiments of the present disclosure, processing sub-band monitoring conflicts may be to drop the monitoring of the CSI measurement reference signal on the first sub-band, or to drop the control channel monitoring and/or data reception on the second sub-band, so as to eliminate sub-band monitoring conflicts that have occurred.

In embodiments of the present disclosure, the priorities of CSI measurement reference signal monitoring on the first sub-band and control channel monitoring and/or data scheduling on the second sub-band may be predefined.

In an example, in embodiments of the present disclosure, CSI measurement reference signal monitoring on the first sub-band and the priority for control channel monitoring and/or data scheduling on the second sub-band may be defined based on the periodic attribute information of CSI measurement reference signal monitoring, and the control channel monitoring and/or data channel scheduling type.

The periodic attribute information of the monitored CSI measurement reference signal may include a periodic monitoring CSI reference signal and an aperiodic monitoring CSI measurement reference signal. The data channel scheduling type may include dynamic scheduling PDSCH, semi-persistent scheduling (SPS) PDSCH, etc.

For example, the priority of monitoring the CSI measurement reference signal on the first sub-band and the control channel monitoring and/or data scheduling on the second sub-band may include at least one of the following.

A priority of dynamic PDSCH is higher than a priority of periodic CSI measurement. A priority of aperiodic CSI measurement is higher than a priority of PDCCH. A priority of PDCCH is higher than a priority of periodic CSI measurement. A priority of aperiodic CSI measurement is higher than a priority of SPS PDSCH. A priority of SPS PDSCH is higher than a priority of periodic CSI-RS.

In the communication method provided by embodiments of the present disclosure, when the sub-band monitoring conflict processing is performed based on the priority of monitoring the CSI measurement reference signal on the first sub-band and the control channel monitoring and/or data scheduling on the second sub-band, the information transmitted on the sub-band with a relatively lower priority may be dropped to ensure effective transmission of information on the sub-band with a relatively higher priority.

The embodiments of the present disclosure are as follows combined with examples, based on the above-mentioned control channel and/or data channel scheduling type involved in the sub-band monitoring conflict, and the CSI measurement reference signal, a process of processing information transmitted on at least one sub-band where the sub-band monitoring conflict occurs is described.

In an example, if it is determined that the CSI measurement reference signal involved in the occurrence of the sub-band monitoring conflict is a periodic CSI measurement reference signal, and the data channel scheduling type is a dynamically scheduled physical downlink data channel, that is, the periodic CSI measurement reference signal is monitored on the first sub-band and dynamically scheduled PDSCH data is received on the second sub-band, the monitoring of the periodic CSI measurement reference signal on the first sub-band is dropped, and data reception is performed on the second sub-band.

Figure 3:
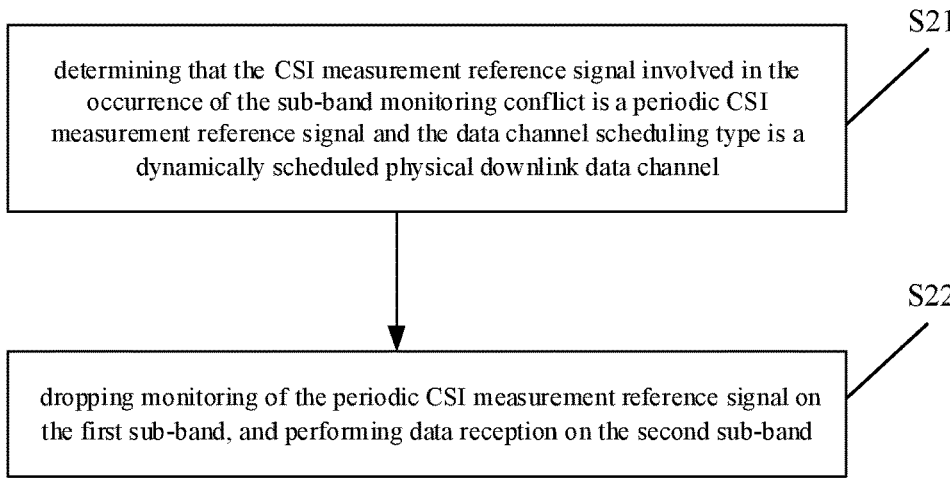
FIG. 3 is a flowchart illustrating a communication method according to an illustrative embodiment.

FIG. 3 is a flowchart illustrating a communication method according to an illustrative embodiment. As shown in FIG. 3, the communication method includes the following steps.

In step S21, it is determined that the CSI measurement reference signal involved in the occurrence of the sub-band monitoring conflict is a periodic CSI measurement reference signal, and the data channel scheduling type is a dynamically scheduled PDSCH.

In step S22, monitoring of the periodic CSI measurement reference signal on the first sub-band is dropped, and data reception is performed on the second sub-band.

In the communication method provided by embodiments of the present disclosure, if the CSI measurement reference signal involved in the occurrence of the sub-band monitoring conflict is the periodic CSI measurement reference signal, and the data channel scheduling type is dynamically scheduled PDSCH, the monitoring of the periodic CSI measurement reference signal on the first sub-band is dropped and the data reception is performed on the second sub-band, which may eliminate sub-band monitoring conflicts that have occurred and prioritize ensuring effective data reception.

In another example, if the CSI measurement reference signal involved in the occurrence of the sub-band monitoring conflict is an aperiodic CSI measurement reference signal, and the data channel scheduling type is PDSCH of SPS, that is, the aperiodic CSI measurement reference signal is monitored on the first sub-band, and the SPS PDSCH data reception is performed on the second sub-band, the data reception on the second sub-band is dropped, and the aperiodic CSI measurement reference signal is monitored on the first sub-band.

Figure 4:
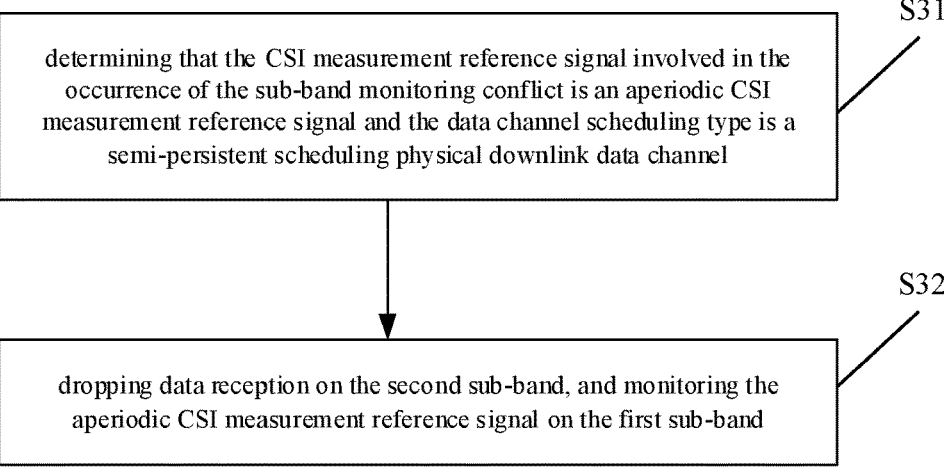
FIG. 4 is a flowchart illustrating a communication method according to an illustrative embodiment.

FIG. 4 is a flowchart illustrating a communication method according to an illustrative embodiment. As shown in FIG. 4, the communication method includes the following steps.

In step S31, it is determined that the CSI measurement reference signal involved in the occurrence of the sub-band monitoring conflict is aperiodic CSI measurement reference signal, and the data channel scheduling type is SPS PDSCH.

In step S32, data reception on the second sub-band is dropped, and the aperiodic CSI measurement reference signal is monitored on the first sub-band.

In the communication method provided by embodiments of the present disclosure, in case that the aperiodic CSI measurement reference signal is monitored on the first sub-band, and the SPS PDSCH data reception is performed on the second sub-band, data reception is dropped on the second sub-band, and the aperiodic CSI measurement reference signal is monitored on the first sub-band, which may eliminate sub-band monitoring conflicts that have occurred and prioritize the monitoring of the aperiodic CSI measurement reference signal.

In another example, if the CSI measurement reference signal involved in the occurrence of the sub-band monitoring conflict is a periodic CSI measurement reference signal, and a monitored channel is a control channel, that is, the periodic CSI measurement reference signal is performed on the first sub-band, and the PDCCH is monitored on the second sub-band, then the monitoring of the periodic CSI measurement reference signal on the first sub-band is dropped, and PDCCH monitoring is performed on the second sub-band.

Figure 5:
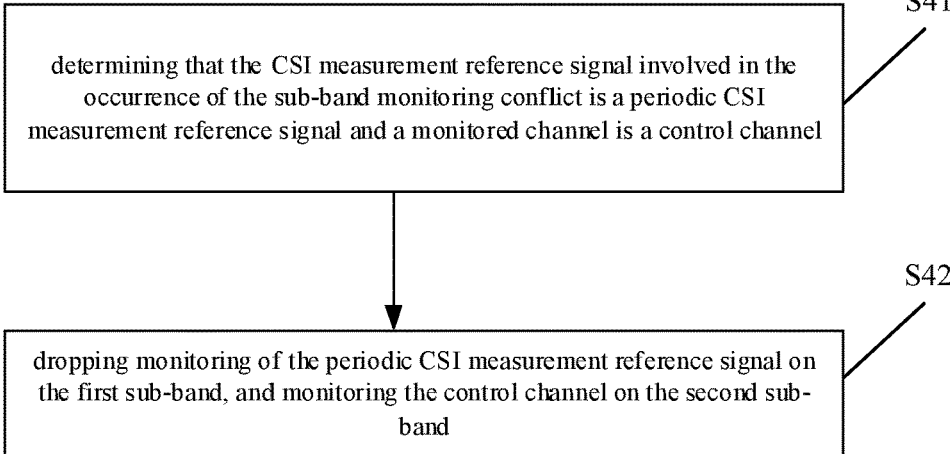
FIG. 5 is a flowchart illustrating a communication method according to an illustrative embodiment.

FIG. 5 is a flowchart illustrating a communication method according to an illustrative embodiment. As shown in FIG. 5, the communication method includes the following steps.

In step S41, it is determined that the CSI measurement reference signal involved in the occurrence of the sub-band monitoring conflict is a periodic CSI measurement reference signal, and a monitored channel is a control channel.

In step S42, monitoring of the periodic CSI measurement reference signal on the first sub-band is dropped, and the control channel is monitored on the second sub-band.

In the communication method provided by embodiments of the present disclosure, in case that the periodic CSI measurement reference signal is monitored on the first sub-band, and the PDCCH is monitored on the second sub-band, monitoring of the periodic CSI measurement reference signal on the first sub-band is dropped, and PDCCH monitoring is performed on the second sub-band, which may eliminate the sub-band monitoring conflicts that have occurred and prioritize the monitoring of PDCCH to improve communication performance.

In another example, if a sub-band monitoring conflict occurs, the CSI measurement reference signal involved is an aperiodic CSI measurement reference signal, and the monitored channel is a control channel, that is, the aperiodic CSI measurement reference signal is monitored on the first sub-band, and control channel monitoring is monitored on the second sub-band, then the control channel monitoring on the second sub-band is dropped, and the aperiodic CSI measurement reference signal is monitored on the first sub-band.

FIG. 6 is a flowchart illustrating a communication method according to an illustrative embodiment. As shown in FIG. 6, the communication method includes the following steps.

In step S51, it is determined that the CSI measurement reference signal involved in the occurrence of the sub-band monitoring conflict is an aperiodic CSI measurement reference signal, and a monitored channel is a control channel.

In step S52, monitoring of the control channel on the second sub-band is dropped, and the aperiodic CSI measurement reference signal is monitored on the first sub-band.

In the communication method provided by embodiments of the present disclosure, in case that the aperiodic CSI measurement reference signal is monitored on the first sub-band, and the control channel is monitored on the second sub-band, monitoring of control channel on the second sub-band is dropped, and the aperiodic CSI measurement reference signal is monitored on the first sub-band, which may eliminate sub-band monitoring conflicts that have occurred and prioritize the monitoring of the aperiodic CSI measurement reference signal to improve communication performance.

In another example, if the CSI measurement reference signal involved in the occurrence of the sub-band monitoring conflict is a periodic CSI reference signal, and the data channel scheduling type is SPS PDSCH, that is, the periodic CSI reference signal is monitored on the first sub-band, and SPS PDSCH data reception is performed on the second sub-band, then monitoring of the periodic CSI measurement reference signal on the first sub-band is dropped, and data reception is performed on the second sub-band.

FIG. 7 is a flowchart illustrating a communication method according to an illustrative embodiment. As shown in FIG. 7, the communication method includes the following steps.

In step S61, it is determined that the CSI measurement reference signal involved in the occurrence of the sub-band monitoring conflict is a periodic CSI reference signal, and the data channel scheduling type is SPS PDSCH.

In step S62, monitoring of the periodic CSI reference signal on the first sub-band is dropped, and data reception is performed on the second sub-band.

In the communication method provided by the embodiments of the present disclosure, sub-band monitoring conflict processing may be performed based on the monitoring of the CSI measurement reference signal on the first sub-band and the monitoring of the control channel on the second sub-band and/or the priority of data scheduling, which prioritize the transmission of information on relatively high priority sub-bands for processing to ensure that the monitoring of CSI measurement reference signals, and the communication process of control channel monitoring and/or data reception are carried out effectively.

In the communication method provided by the embodiments of the present disclosure, in another implementation, the sub-band for monitoring a control resource set (CORESET) and/or the data reception position may be adjusted based on a monitoring position of the CSI measurement reference signal involved in the occurrence of the sub-band monitoring conflict, so as to eliminate sub-band monitoring conflicts that have occurred.

In the communication method provided by the embodiments of the present disclosure, based on the monitoring position of the CSI measurement reference signal involved in the occurrence of the sub-band monitoring conflict, adjusting the sub-band for monitoring the CORESET and/or adjusting the data receiving position may be monitoring CORESET on the first sub-band during a process of measuring the CSI on the first sub-band (that is, the monitoring position of the CSI measurement reference signal is at the monitoring position of the unfinished CSI measurement reference signal). During the CSI measurement process on the first sub-band (that is, the monitoring position of the CSI measurement reference signal is at the monitoring position of the unfinished CSI measurement reference signal), if data is received, the scheduled data is transmitted on the first sub-band at the same time.

Figures 8, 9:
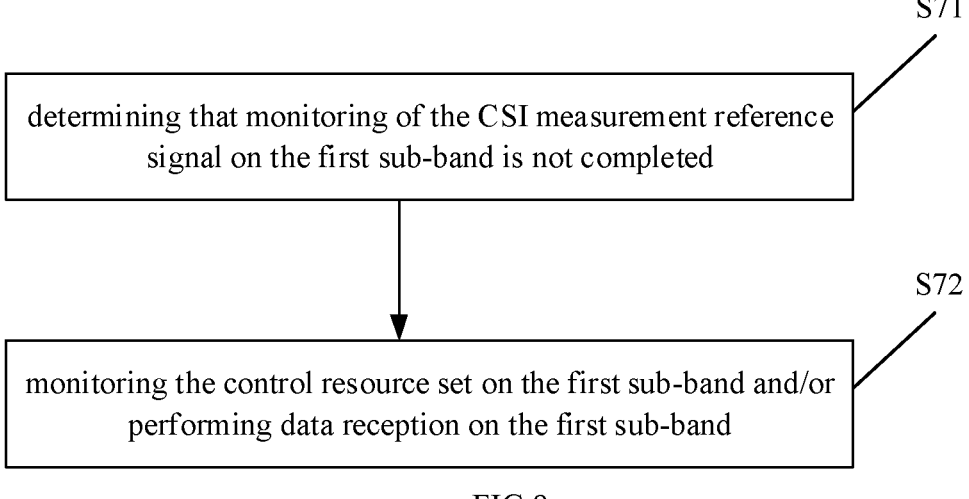
FIG. 8 is a flowchart illustrating a communication method according to an illustrative embodiment.
FIG. 9 is a block diagram illustrating a communication apparatus according to an illustrative embodiment.

FIG. 8 is a flowchart illustrating a communication method according to an illustrative embodiment. As shown in FIG. 8, the communication method includes the following steps.

In step S71, it is determined that monitoring of the CSI measurement reference signal on the first sub-band is not completed.

In step S72, CORESET is monitored on the first sub-band and/or data reception is performed on the first sub-band.

In the communication method provided by embodiments of the present disclosure, based on the monitoring position of the CSI measurement reference signal where the sub-band monitoring conflict occurs, when adjusting the sub-band for monitoring CORESET and/or adjusting the data receiving position, if the monitoring of CSI measurement reference signal on the first sub-band is completed (that is, the monitoring position of the CSI measurement reference signal is at the monitoring position where the CSI measurement reference signal is completed), the sub-band for monitoring the CORESET and/or the data receiving position may be further adjusted.

In the communication method provided by embodiments of the present disclosure, in response to monitoring of the CSI measurement reference signal on the first sub-band being completed, adjusting the sub-band for monitoring the CORESET and/or adjusting the data reception position in one of following ways:

A: continuing monitoring the CORESET on the first sub-band and/or continuing receiving data on the first sub-band;

B: monitoring the CORESET on the second sub-band and/or performing data reception on the second sub-band;

C: performing data reception on a predefined sub-band. Data reception on predefined sub-bands.

In an example, assume that the first sub-band is the measurement sub-band virtual BWP 1. The position adjustment of CORESET or data transmission position based on CSI measurement may be done in the following ways.

When it is determined that the CSI measurement reference signal needs to be monitored on virtual BWP 1, CORESET on virtual BWP 1 is monitored. If data is received at this time, the scheduled data is received on virtual BWP 1 at the same time.

After the CSI measurement is completed, there are several ways to monitor BWP.

Manner 1: the terminal continues receiving data and monitoring the control channel (CORESET) on the BWP that has completed CSI measurement reference signal monitoring.

Manner 2: the terminal returns to the BWP before performing CSI-RS measurement to receive data.

Manner 3: the terminal returns to the predefined BWP (default BWP) to receive data.

In the communication method provided by the embodiments of the present disclosure, based on the monitoring position of the CSI measurement reference signal involved in the occurrence of the sub-band monitoring conflict, adjusting the sub-band for monitoring the CORESET and/or adjusting the data receiving position may eliminate the sub-band monitoring conflict that has occurred, and ensure the monitoring of CSI measurement reference signals, and the communication process of control channel monitoring and/or data reception are carried out effectively.

The communication method provided by embodiments of the present disclosure, in case of determining that the sub-band monitoring conflict occurs in the terminal, the information transmitted on at least one sub-band where the sub-band monitoring conflict occurs is processed, and the sub-band monitoring conflict is processed, which eliminates the occurrence of the sub-band monitoring conflicts, thereby improving the communication performance of information transmitted on the sub-bands.

It may be understood that, in some possible implementations, the above-mentioned embodiments of the present disclosure take sub-band monitoring conflicts that occur during downlink communication as an example for explanation. However, those skilled in the art may understand that the technical solution for resolving sub-band monitoring conflicts involved in the present disclosure may also be extended and applied to scenarios in which uplink sub-band monitoring conflicts occur in terminals. For example, for an uplink sub-band monitoring conflict occurring in a terminal, the terminal may send data and/or monitor a control channel on one sub-band, and send an uplink measurement reference signal on another sub-band. The technical solution for the uplink sub-band monitoring conflict resolution is similar to the technical solution for the downlink sub-band monitoring conflict resolution. For example, the above-mentioned embodiments all use "control channel monitoring and/or data reception needs to be performed on the second sub-band" as an example to illustrate. However, those skilled in the art may understand that information transmission may include, for example, uplink transmission and/or downlink transmission; the transmission may be a signaling or user data. In an example, the data reception involved in the above-mentioned embodiments may be replaced by data transmission, the CSI measurement reference signal may be replaced by the uplink measurement reference signal, and so on, which will not be described in detail in embodiments of the present disclosure.

It is noted that those skilled in the art may understand that the various implementations/embodiments mentioned above in embodiments of the present disclosure may be used in conjunction with the foregoing embodiments or may be used independently. Whether it is used alone or in combination with the foregoing embodiments, its implementation principles are similar. During the implementation of the present disclosure, some embodiments are described in the manner of being used together. Of course, those skilled in the art may understand that such an illustration is not a limitation to embodiments of the present disclosure Based on the same conception, embodiments of the present disclosure also provides a communication apparatus.

It is understood that, in order to implement the above-mentioned functions, the communication apparatus provided by embodiments of the present disclosure includes a corresponding hardware structure and/or software module for performing each function. Combined with the units and algorithm steps of each example disclosed in embodiments of the present disclosure, embodiments of the present disclosure may be implemented in a form of hardware or a combination of hardware and computer software. Whether a function is performed by a hardware or a computer software driving the hardware depends on the specific application and design constraints of the technical solution. Those skilled in the art may use different methods to implement the described functions for each specific application, but such implementation is not considered to extend beyond the scope of the technical solutions of embodiments of the present disclosure.

FIG. 9 is a block diagram of a communication device according to an illustrative embodiment. Referring to FIG. 9, the communication device 100 includes a processing unit 101.

The processing unit 101 is configured to determine that a sub-band monitoring conflict occurs in a terminal and process information transmitted on at least one sub-band where the sub-band monitoring conflict occurs; in which the sub-band monitoring conflict occurring in the terminal comprises that the terminal needs to monitor a channel state information (CSI) measurement reference signal on a first sub-band, and needs to perform control channel monitoring and/or data reception on a second sub-band.

In one embodiment, the processing unit 101 is configured to process the information transmitted on at least one sub-band where the sub-band monitoring conflict occurs based on a control channel and/or a data channel scheduling type involved in occurrence of the sub-band monitoring conflict and the CSI measurement reference signal.

In one embodiment, the processing unit 101 is configured to drop monitoring of the periodic CSI measurement reference signal on the first sub-band, and perform data reception on the second sub-band in case of determining that the CSI measurement reference signal involved in the occurrence of the sub-band monitoring conflict is a periodic CSI measurement reference signal and the data channel scheduling type is a dynamically scheduled physical downlink data channel.

In one embodiment, the processing unit 101 is configured to drop data reception on the second sub-band, and monitor the aperiodic CSI measurement reference signal on the first sub-band in case of determining that the CSI measurement reference signal involved in the occurrence of the sub-band monitoring conflict is an aperiodic CSI measurement reference signal and the data channel scheduling type is a semi-persistent scheduling physical downlink data channel.

In one embodiment, the processing unit 101 is configured to drop monitoring of the periodic CSI measurement reference signal on the first sub-band, and monitor the control channel on the second sub-band in case of determining that the CSI measurement reference signal involved in the occurrence of the sub-band monitoring conflict is a periodic CSI measurement reference signal and a monitored channel is a control channel.

In one embodiment, the processing unit 101 is configured to drop monitoring of the control channel on the second sub-band, and monitor the aperiodic CSI measurement reference signal on the first sub-band in case of determining that the CSI measurement reference signal involved in the occurrence of the sub-band monitoring conflict is an aperiodic CSI measurement reference signal and a monitored channel is a control channel.

In one embodiment, if the processing unit 101 is configured to drop monitoring of the periodic CSI reference signal on the first sub-band, and perform data reception on the second sub-band in case of determining that the CSI measurement reference signal involved in the occurrence of the sub-band monitoring conflict is a periodic CSI reference signal, and the data channel scheduling type is a semi-persistent scheduling physical downlink data channel.

In one embodiment, the processing unit 101 is configured to adjust a sub-band for monitoring a control resource set and/or adjusting a data reception position based on a monitoring position of the CSI measurement reference signal involved in the occurrence of the sub-band monitoring conflict.

In one embodiment, the processing unit 101 is configured to monitor the control resource set on the first sub-band and/or performing data reception on the first sub-band in response to monitoring of the CSI measurement reference signal on the first sub-band being not completed.

In one embodiment, in response to the monitoring of the CSI measurement reference signal on the first sub-band being completed, the processing unit 101 is configured to adjust the sub-band for monitoring the CORESET and/or adjust the data reception position in one of following ways: continuing monitoring the CORESET on the first sub-band and/or continuing receiving data on the first sub-band; monitoring the CORESET on the second sub-band and/or performing data reception on the second sub-band; performing data reception on a predefined sub-band.

Regarding the apparatus in the above-mentioned embodiments, the specific manners in which each module performs operations has been described in detail in embodiments related to the method, and will not be described in detail here.

Figure 10:
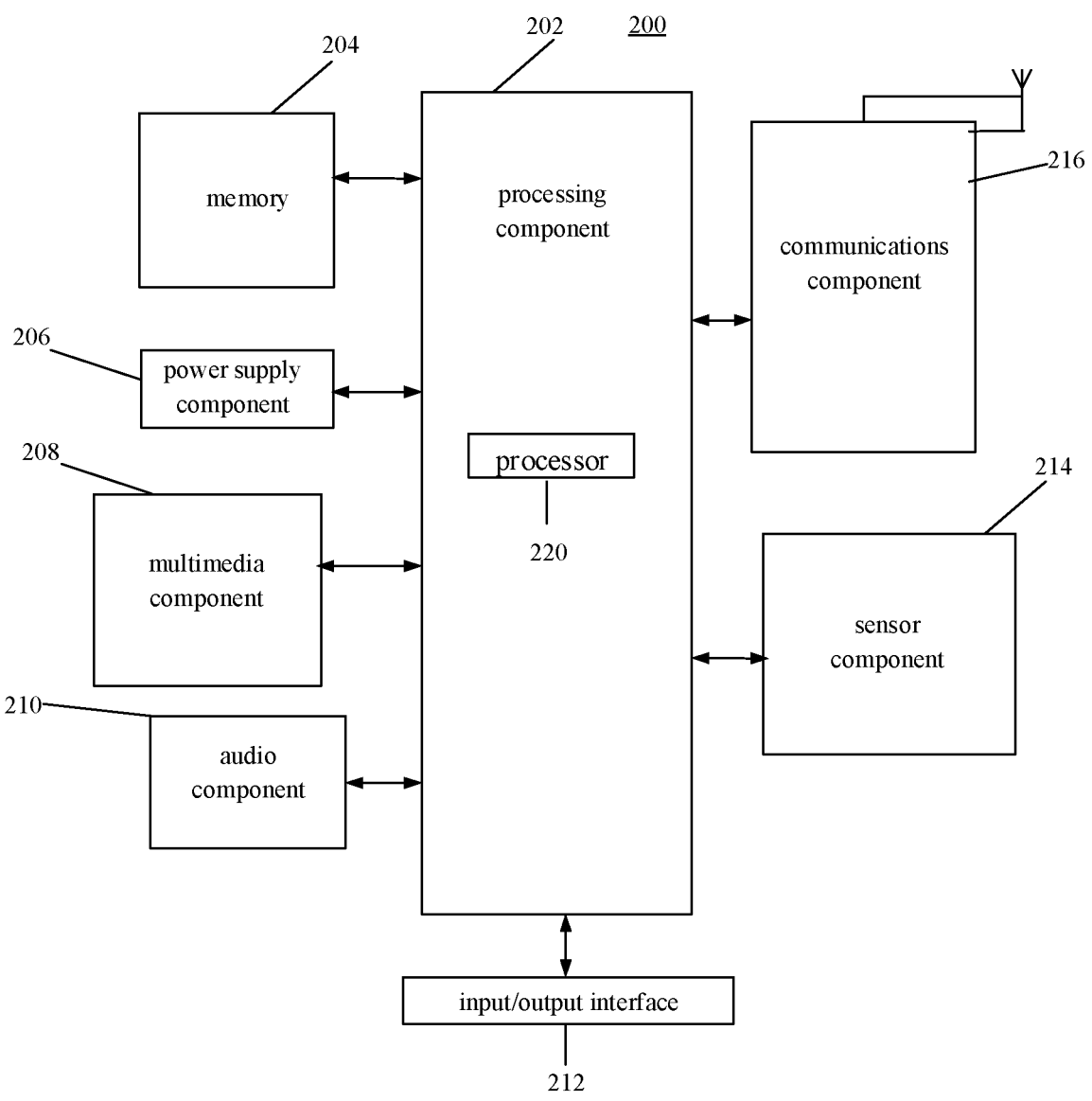
FIG. 10 is a block diagram illustrating a device for communication according to an illustrative embodiment.

FIG. 10 is a block diagram of a device for communication according to an illustrative embodiment. For example, the device 200 may be a mobile phone, a computer, a digital broadcast terminal, a messaging device, a game console, a tablet device, a medical device, a fitness device, a personal digital assistant, or the like.

Referring to FIG. 10, the device 200 may include one or more of the following components: a processing component 202, a memory 204, a power supply component 206, a multimedia component 208, an audio component 210, an input/output (I/O) interface 212, a sensor component 214, and a communications component 216.

The processing component 202 generally controls the overall operations of device 200, such as the operations associated with display, telephone calls, data communications, camera operations, and recording operations. The processing component 202 may include one or more processors 220 to execute instructions to complete all or part of the steps of the above-mentioned method. Additionally, the processing component 202 may include one or more modules that facilitate the interaction between the processing component 202 and other components. For example, the processing component 202 may include a multimedia module to facilitate the interaction between the multimedia component 208 and the processing component 202.

The memory 204 is configured to store various types of data to support the operations of the device 200. Examples of such data include instructions for any application or method operated on device 200, contact data, phonebook data, messages, pictures, videos, and the like. The memory 204 may be implemented by using any type of volatile or non-volatile storage device, or a combination thereof, such as a static random access memory (SRAM), an electrically erasable programmable read-only memory (EEPROM), an erasable programmable read-only memory (EPROM), a programmable read only memory (PROM), a read-only memory (ROM), a magnetic memory, a flash memory, a magnetic or optical disk.

The power supply component 206 provides power to various components of the device 200. The power supply components 206 may include a power management system, one or more power supplies, and any other components associated with the generation, managing, and distribution of power in the device 200.

The multimedia component 208 includes a screen providing an output interface between the device 200 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of a touch or a swipe action, but also sense awake time and a pressure associated with the touch or swipe action. In some embodiments, the multimedia component 208 includes a front camera and/or a rear camera. The front camera and/or the rear camera may receive an external multimedia data while the device 200 is in an operation mode, such as a photographing mode or a video mode. Each of the front camera and the rear camera may be a fixed optical lens system or have focal and optical zoom capability.

The audio component 210 is configured to output and/or input audio signals. For example, the audio component 210 includes a microphone (MIC) configured to receive an external audio signal when the device 200 is in an operation mode, such as a call mode, a recording mode and a voice recognition mode. The received audio signal may be further stored in the memory 204 or transmitted via communication component 216. In some embodiments, the audio component 210 further includes a speaker to output audio signals.

The I/O interface 212 provides an interface between the processing component 202 and peripheral interface modules, such as a keyboard, a click wheel, a button, and the like. These buttons may include, but are not limited to, a home button, a volume button, a starting button, and a locking button.

The sensor component 214 includes one or more sensors to provide status assessments of various aspects of the device 200. For example, the sensor component 214 may detect an open/closed status of the device 200, relative positioning of components, e.g., the display and the keypad, of the device 200, a change in position of the device 200 or a component of the device 200, a presence or absence of user contact with the device 200, an orientation or an acceleration/deceleration of the device 200, and a change in temperature of the device 200. The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an acceleration sensor, a gyroscope sensor, a magnetic sensor, a pressure sensor or a temperature sensor.

The communication component 216 is configured to facilitate communication, wired or wireless, between the device 200 and other devices. The device 200 may access a wireless network based on a communication standard, such as WiFi, 2G or 3G, or a combination thereof. In illustrative embodiments, the communication component 216 receives a broadcast signal or broadcast related information from an external broadcast management system via a broadcast channel. In illustrative embodiments, the communication component 216 further includes a near field communication (NFC) module to facilitate short-range communication. For example, the NFC module may be implemented based on a radio frequency identification (RFID) technology, an infrared data association (IrDA) technology, an ultra wideband (UWB) technology, a Bluetooth (BT) technology and other technologies.

In illustrative embodiments, the device 200 may be implemented with one or more application specific integrated circuits (ASICs), digital signal processors (DSPs), digital signal processing devices (DSPDs), programmable logic devices (PLDs), field programmable gate arrays (FPGAs), controllers, microcontroller, microprocessors, or other electronic components, for performing the above-mentioned method.

In illustrative embodiments, a non-transitory computer-readable storage medium including instructions is also provided, such as a memory 204 including instructions, which may be executed by a processor 220 of the device 200 to implement the above-mentioned method. For example, the non-transitory computer readable storage medium may be a ROM, a random access memory (RAM), a CD-ROM, a magnetic tape, a floppy disk, an optical data storage device, and the like.

It may be further understood that "a plurality of" in the present disclosure refers to two or more, and other quantifiers are similar thereto. The term "and/or" describes a relationship between related objects, indicating that there are three relationships. For example, A and/or B may mean: A exists alone, A and B exist simultaneously, and B exists alone. The character "/" generally indicates that the contextual objects are an "or" relationship. The singular forms "a/an", "said" and "the" are also intended to include plural unless the context clearly dictates otherwise.

It is further understood that the terms "first", "second", etc. are used to describe various information, but the information should not be limited to these terms. These terms are only used to distinguish information of the same type from one another, and do not imply a specific order or degree of importance. In fact, expressions such as "first" and "second" may be used interchangeably. For example, without departing from the scope of the present disclosure, the first information may also be called the second information, and similarly, the second information may also be called the first information.

It will be further understood that although operations are described in a specific order in the drawings in embodiments of the present disclosure, this should not be understood as requiring that these operations are performed in the specific order shown or in a serial order, or that all of the operations shown are performed to obtain the desired result. In certain circumstances, multitasking and parallel processing may be advantageous.

Other embodiments of the present disclosure will be apparent to those skilled in the art from consideration of the specification and practice of the present disclosure disclosed here. The present disclosure is intended to cover any variations, uses, or adaptations of embodiments of the present disclosure following the general principles thereof and including such departures from embodiments of the present disclosure as come within known or customary practice in the art. It is intended that the specification and the examples be considered as illustrative only, with a true scope and spirit of the embodiments of the present disclosure being indicated by the following claims.

It is appreciated that embodiments of the present disclosure are not limited to the exact construction that has been described above and illustrated in the accompanying drawings, and that various modifications and changes may be made without departing from the scope thereof. It is intended that the scope of embodiments of the present disclosure only be limited by the appended claims.

What is claimed is:

1. A communication method, comprising:

processing information transmitted on at least one sub-band where sub-band monitoring conflict occurs in response to determining that the sub-band monitoring conflict occurs in a terminal;

wherein the sub-band monitoring conflict occurring in the terminal comprises that the terminal needs to monitor a channel state information (CSI) measurement reference signal on a first sub-band, and needs to perform at least one of control channel monitoring or data reception on a second sub-band;

wherein processing the information transmitted on at least one sub-band where the sub-band monitoring conflict occurs comprises:

processing the information transmitted on at least one sub-band where the sub-band monitoring conflict occurs based on at least one of a control channel or a data channel scheduling type involved in occurrence of the sub-band monitoring conflict and the CSI measurement reference signal;

wherein processing the information transmitted on at least one sub-band where the sub-band monitoring conflict occurs based on at least one of the control channel or the data channel scheduling type involved in the occurrence of the sub-band monitoring conflict and the CSI measurement reference signal comprises:

in case of determining that the CSI measurement reference signal involved in the occurrence of the sub-band monitoring conflict is an aperiodic CSI measurement reference signal and the data channel scheduling type is a semi-persistent scheduling physical downlink data channel, dropping data reception on the second sub-band, and monitoring the aperiodic CSI measurement reference signal on the first sub-band; or in case of determining that the CSI measurement reference signal involved in the occurrence of the sub-band monitoring conflict is a periodic CSI measurement reference signal and a monitored channel is a control channel, dropping monitoring of the periodic CSI measurement reference signal on the first sub-band, and monitoring the control channel on the second sub-band; or in case of determining that the CSI measurement reference signal involved in the occurrence of the sub-band monitoring conflict is an aperiodic CSI measurement reference signal and a monitored channel is a control channel, dropping monitoring of the control channel on the second sub-band, and monitoring the aperiodic CSI measurement reference signal on the first sub-band; or in case of determining that the CSI measurement reference signal involved in the occurrence of the sub-band monitoring conflict is a periodic CSI reference signal, and the data channel scheduling type is a semi-persistent scheduling physical downlink data channel, dropping monitoring of the periodic CSI reference signal on the first sub-band, and performing data reception on the second sub-band.

2. The communication method according to claim 1, wherein processing the information transmitted on at least one sub-band where the sub-band monitoring conflict occurs comprises:

performing at least one of adjusting a sub-band for monitoring a control resource set or adjusting a data reception position based on a monitoring position of the CSI measurement reference signal involved in the occurrence of the sub-band monitoring conflict.

3. The communication method according to claim 2, wherein performing at least one of adjusting the sub-band for monitoring the control resource set or adjusting the data reception position based on the monitoring position of the CSI measurement reference signal involved in the occurrence of the sub-band monitoring conflict comprises:

performing at least one of monitoring the control resource set on the first sub-band or data reception on the first sub-band in response to monitoring of the CSI measurement reference signal on the first sub-band being not completed.

4. The communication method according to claim 2, further comprising:

in response to the monitoring of the CSI measurement reference signal on the first sub-band being completed, performing at least one of adjusting the sub-band for monitoring the control resource set or adjusting the data reception position in one of following ways:

performing at least one of continuing monitoring the control resource set on the first sub-band or continuing receiving data on the first sub-band;

performing at least one of monitoring the control resource set on the second sub-band or data reception on the second sub-band; and performing data reception on a predefined sub-band.

5. A communication device, comprising:

a processor;

a memory for storing instructions executable by the processor;

wherein the processor is configured to:

process information transmitted on at least one sub-band where sub-band monitoring conflict occurs in response to determining that the sub-band monitoring conflict occurs in a terminal;

wherein the sub-band monitoring conflict occurring in the terminal comprises that the terminal needs to monitor a channel state information (CSI) measurement reference signal on a first sub-band, and needs to perform at least one of control channel monitoring or data reception on a second sub-band;

wherein the processor is configured to:

process the information transmitted on at least one sub-band where the sub-band monitoring conflict occurs based on at least one of a control channel or a data channel scheduling type involved in occurrence of the sub-band monitoring conflict and the CSI measurement reference signal;

wherein the processor is configured to:

in case of determining that the CSI measurement reference signal involved in the occurrence of the sub-band monitoring conflict is an aperiodic CSI measurement reference signal and the data channel scheduling type is a semi-persistent scheduling physical downlink data channel, drop data reception on the second sub-band, and monitor the aperiodic CSI measurement reference signal on the first sub-band; or in case of determining that the CSI measurement reference signal involved in the occurrence of the sub-band monitoring conflict is a periodic CSI measurement reference signal and a monitored channel is a control channel, drop monitoring of the periodic CSI measurement reference signal on the first sub-band, and monitor the control channel on the second sub-band; or in case of determining that the CSI measurement reference signal involved in the occurrence of the sub-band monitoring conflict is an aperiodic CSI measurement reference signal and a monitored channel is a control channel, drop monitoring of the control channel on the second sub-band, and monitor the aperiodic CSI measurement reference signal on the first sub-band; or in case of determining that the CSI measurement reference signal involved in the occurrence of the sub-band monitoring conflict is a periodic CSI reference signal, and the data channel scheduling type is a semi-persistent scheduling physical downlink data channel, drop monitoring of the periodic CSI reference signal on the first sub-band, and perform data reception on the second sub-band.

6. The communication device according to claim 5, wherein the processor is configured to:

perform at least one of adjusting a sub-band for monitoring a control resource set or adjusting a data reception position based on a monitoring position of the CSI measurement reference signal involved in the occurrence of the sub-band monitoring conflict.

7. The communication device according to claim 6, wherein the processor is configured to:

perform at least one of monitoring the control resource set on the first sub-band or data reception on the first sub-band in response to monitoring of the CSI measurement reference signal on the first sub-band being not completed.

8. A non-transitory storage medium having stored therein instructions that, when executed by a processor of a terminal, cause the terminal to:

process information transmitted on at least one sub-band where sub-band monitoring conflict occurs in response to determining that the sub-band monitoring conflict occurs in a terminal;

wherein the sub-band monitoring conflict occurring in the terminal comprises that the terminal needs to monitor a channel state information (CSI) measurement reference signal on a first sub-band, and needs to perform at least one of control channel monitoring or data reception on a second sub-band;

wherein instructions are executed by the processor of the terminal to cause the terminal to:

process the information transmitted on at least one sub-band where the sub-band monitoring conflict occurs based on at least one of a control channel or a data channel scheduling type involved in occurrence of the sub-band monitoring conflict and the CSI measurement reference signal;

wherein instructions are executed by the processor of the terminal to cause the terminal to:

in case of determining that the CSI measurement reference signal involved in the occurrence of the sub-band monitoring conflict is an aperiodic CSI measurement reference signal and the data channel scheduling type is a semi-persistent scheduling physical downlink data channel, drop data reception on the second sub-band, and monitor the aperiodic CSI measurement reference signal on the first sub-band; or in case of determining that the CSI measurement reference signal involved in the occurrence of the sub-band monitoring conflict is a periodic CSI measurement reference signal and a monitored channel is a control channel, drop monitoring of the periodic CSI measurement reference signal on the first sub-band, and monitor the control channel on the second sub-band; or in case of determining that the CSI measurement reference signal involved in the occurrence of the sub-band monitoring conflict is an aperiodic CSI measurement reference signal and a monitored channel is a control channel, drop monitoring of the control channel on the second sub-band, and monitor the aperiodic CSI measurement reference signal on the first sub-band; or in case of determining that the CSI measurement reference signal involved in the occurrence of the sub-band monitoring conflict is a periodic CSI reference signal, and the data channel scheduling type is a semi-persistent scheduling physical downlink data channel, drop monitoring of the periodic CSI reference signal on the first sub-band, and perform data reception on the second sub-band.

* * * * *